United States Patent [19]

Riemer et al.

[11] Patent Number: 4,514,467
[45] Date of Patent: Apr. 30, 1985

[54] METHOD OF OBTAINING A POSITIVE BOND BETWEEN PAINTED ARTICLES AND CONCRETE

[75] Inventors: Heinz Riemer, Bottrop; Joern-Volker Weiss, Haltern; Friedhelm Mutzberg, Muelheim, all of Fed. Rep. of Germany

[73] Assignee: Chemische Werke Huels, AG, Marl, Fed. Rep. of Germany

[21] Appl. No.: 505,039

[22] Filed: Jun. 16, 1983

[30] Foreign Application Priority Data

Jun. 16, 1982 [DE] Fed. Rep. of Germany ....... 3222529

[51] Int. Cl.³ .................. B32B 27/38; B05D 3/02; B05D 1/36
[52] U.S. Cl. ................... 428/413; 52/309.16; 138/141; 138/146; 156/330; 427/203; 427/386; 427/403; 523/401; 523/414; 523/420
[58] Field of Search ............... 156/330; 138/141, 146; 52/309.16; 428/413; 427/203, 403, 386; 523/401, 420, 414

[56] References Cited

U.S. PATENT DOCUMENTS

| | | | |
|---|---|---|---|
| 3,310,511 | 3/1967 | Reinert | 156/330 |
| 3,798,191 | 3/1974 | Donnelly | 523/401 |
| 3,926,886 | 12/1975 | Kelley et al. | 523/414 |
| 4,392,335 | 7/1983 | Heiman | 428/413 |
| 4,395,159 | 7/1983 | Karuks et al. | 427/403 |
| 4,421,797 | 12/1983 | Koehne | 427/403 |

FOREIGN PATENT DOCUMENTS 53-65335 6/1978 Japan ................... 427/386

*Primary Examiner*—John J. Gallagher
*Attorney, Agent, or Firm*—Millen & White

[57] ABSTRACT

A method for obtaining a positive bond between articles painted or coated with thermosets and concrete, involves treatment of the surface with an epoxy resin-cement mortar mixture containing an epoxy resin emulsion of the composition (a) a liquid epoxy resin;
(b) water;
(c) an emulsifier comprising a primary, aliphatic alcohol, an adduct thereof with ethylene oxide or, optionally, a polyglycol ester of a carboxylic acid; and
(d) a latent curing agent comprising a reaction product of the essentially complete neutralization of a diamine of the formulae $$H_2N-CH_2-R-NH_2$$

or $$H_2N-R-CH_2-R-NH_2$$

with oxyalic acid, wherein R is alkyl substituted alkylene or cycloalkylene; or the reaction product obtained by complete neutralization with oxalic acid of (i) a polyamine of the formula $$H_2N-CH_2-CH_2-NH-_xH$$

wherein x=2, 3, or 4, or of (ii) a reaction product, containing amino groups, of such a polyamine with a fatty acid.

15 Claims, No Drawings

METHOD OF OBTAINING A POSITIVE BOND BETWEEN PAINTED ARTICLES AND CONCRETE

CROSS REFERENCE TO RELATED APPLICATIONS

This application is related to commonly assigned, U.S. Ser. Nos. 504,928 and 504,929, each filed on even date, now U.S. Pat. Nos. 4,442,245 and 4,440,882 whose disclosures are incorporated by reference herein.

BACKGROUND OF THE INVENTION

In recent times, gaseous and liquid bulk goods, such as gases and oil, are transported to an ever increasing extent using pipelines, often over considerable distances. It is clear that the laying of pipelines along the bottom of the sea as well as in mountainous terrain under very different climatic conditions imposes stringent requirements upon the weathering and corrosion resistance of the protective coatings applied to the pipes.

With unprotected metallic pipes, damage occurs as early as during the laying operation. This leads to rusting through of the pipes due to corrosion after only a brief period of time. Therefore, paints and especially also coating powders have been developed in recent years in an attempt to achieve excellent surface protection (cf., for example, DOS No. 2,507,786). In a number of cases, it is desirable or even necessary to apply a concrete casing to powder-coated pipes. This is the case, for instance, if the pipe is to obtain the weight necessary for submarine laying or if the pipe is to be additionally protected. Moreover, it may also be expedient to bond the pipe firmly to concrete for reasons of a safe laying installation. However, the use of concrete presents the obstacle of poor adhesion to the powder-coated pipe surface. Furthermore, when using powder-coated construction steel materials, a positive bond is required between concrete and the reinforcing steel materials. Such a bond can be realized only unsatisfactorily by special shaping of the steel components.

Processes involving adhesive promotion between concrete and synthetic resin surfaces have been known. Basically, these are applied to the bond between concrete and powder-coated articles. Thus, for example, Japanese Laid-Open Application No. 53 041 020 describes the use of silane primers for improving adhesion of concrete to a urethane resin coat. However, these processes have the disadvantage that the desired improvement in adhesion requires an additional working step.

A bond can also be established between metallic surfaces and concrete by means of vinyl acetate resins containing cement powder. Although adhesion is achieved in this case, corrosion protection is not ensured.

SUMMARY OF THE INVENTION

Accordingly, it is an object of this invention to provide, by means of modified cement mortar mixtures, a positive bond between painted surfaces, e.g., coated with thermosets, and concrete.

Upon further study of the specification and appended claims, further objects and advantages of this invention will become apparent to those skilled in the art.

These objects have been achieved in view of the discovery that such a bond can be attained using the epoxy resin-cement mortar mixtures described in the mentioned commonly assigned U.S. patent applications, filed under even date, and whose disclosures are incorporated by reference herein.

DETAILED DISCUSSION

The epoxy resin-cement mortars used in accordance with this invention contain the epoxy resin-diammonium salt emulsions or epoxy resin-polyammonium salt emulsions described in the mentioned patent applications preferably in amounts of 10-30% by weight, based on the amount of the cement in the mortar. Otherwise, the cement mortar composition itself is fully conventional.

A typical, customary cement mortar mixture which can be utilized for coating the painted articles per this invention, for example, is a mixture having the following composition:
100 parts by weight of Portland cement PZ 35 F
60 parts by weight of water
60 parts by weight of electrostatic filter ash (EFA)
170 parts by weight of sand 0/1 mm
85 parts by weight of sand ⅓ mm
170 parts by weight of sand ⅔ mm For use, the emulsion containing mortar mixtures are preferably directly applied to the painted (coated) surface. In this way, it is possible to coat all painted articles with concrete; for example, this includes articles which have been treated with a liquid epoxy resin. However, it has proved to be especially advantageous to start with powder-coated articles. Powder coating agents based on epoxy resins and cured with amines are especially suitable for applications involving permanently humid environments, (e.g., large-scale submarine pipes, reinforcing steels for bridges, etc.). However, any type of paint can be used in conjunction with this invention.

It is also possible to first treat the painted surface with the mentioned epoxy resin/curing agent emulsions and after drying, then apply a conventional cement mortar mixture thereover. In this option, the amounts of the components correspond to those mentioned above.

The external configuration and also the size of the substrate articles are generally uncritical for the method of this invention, for example, rods, wires, strip stock, plates, panels, and pipes can be treated. Also the material of which these articles is made is of subordinate importance as long as the varnish (painting or coating agent) or powder coating agent firmly adheres thereto. It is possible, for example, to employ wood, synthetic resins, ceramic materials, glass, and metal substrates.

As mentioned, the present process has special significance for the bonding of powder-coated pipes and/or powder-coated reinforcing steel to concrete.

The paint or other coating on the substrate is prepared in fully conventional fashion. The thickness of the epoxy resin-cement mortar mixture of this invention is determined by the particular application. When it forms an intermediate substance between the painted surface and another concrete material its thickness is usually 0.01-0.5 cm, optimal values for a given application being conventionally determinable, perhaps with a few routine preliminary experiments.

Coating articles with power coating compositions is known. See, for example, Ullmanns Encyklopaedie der technischen Chemie [Ullmann's Encyclopedia of Industrial Chemistry] 4th ed., 15: 347 et seq., 1977, whose disclosure is incorporated by reference herein. Typical conventional polymers applied in powder form to the generally metallic surface and forming a protective layer after melting (fusing) or other curing, can be utilized as single-component systems which are not crosslinked and/or which are self-crosslinking. Binder systems based on epoxy resins, such as, for example, bisphenol A, are advantageous for such purposes—for example in bridge construction involving exposure to salt sedimentation, drilling platforms in the offshore region and/or large-scale pipes installed on the ocean floor for transport of oil and gas and encased in concrete for weighting purposes—due to their good mechanical properties (e.g., adhesion to a metallic substrate, abrasion resistance, impact strength, etc.) and due to the good corrosion protection they provide (especially also under salt exposure). The exact chemical structure of the commercially available products, such as "EPIKOTE" 1004 and "EPIKOTE" 828 (manufacturer: Deutsche Shell AG, Hamburg) is unknown.

Suitable conventional crosslinking components for the epoxy resins are acid-reacting polyfunctional resins, e.g. polyesters which contain carboxy groups, modified acid anhydrides, or alkaline curing agents, such as, for example, dicyandiamides, imidazolines, imidazoles, etc.

However, also usable for coating purposes are other powder coating systems, e.g. those based on OH-containing polyesters and aromatic or cycloaliphatic isocyanates, as well as those based on acrylates which contain glycidyl groups, and polyesters which contain carboxy groups.

Moreover, also fully conventionally, flowing resins (flow-enhancing resins) and pigments, as well as optional accelerators, fillers, etc., can be added to the aforementioned binder combinations and other paint systems providing a coating to the substrates treated by this invention.

An advantage of the present invention is that it is possible, for the first time, to establish a positive bond between concrete and powder-coated articles without the need for an additional working step for the application of an adhesion promoter. At the same time, excellent corrosion protection is assured. The process can be utilized, in particular, in the laying of pipes. Another prime application lies in the building industry as will be clear to those skilled in the art since effective bonding between coated substrates and cement is so critical there.

All details of the emulsions useful in this invention are fully disclosed in the mentioned copending U.S. patent applications; however, for purposes of completeness, the compositions involved are briefly summarized below.

The epoxy resin-diammonium salt emulsions comprise:
(a) a liquid epoxy resin;
(b) about 30–130 wt. % of water based on the amount of epoxy resin;
(c) an emulsifying effective amount of an emulsifier comprising a primary, aliphatic alcohol of 8–14 carbon atoms, an adduct thereof with up to 10 ethylene oxide groups, or a mixture thereof; and
(d) an effective amount of a latent curing agent comprising a reaction product of the essentially complete neutralization of a diamine of the formulae $$H_2N-CH_2-R-NH_2$$

or $$H_2N-R-CH_2-R-NH_2$$

with oxalic acid,
wherein R is alkyl substituted alkylene or cycloalkylene each of 6–9 carbon atoms in total, or phenyl alkylene of 7–9 carbon atoms in total.

The epoxy resin-polyammonium salt emulsions (of a different inventive entity) comprise:
(a) a liquid epoxy resin;
(b) water,
(c) an emulsifier comprising a primary aliphatic alcohol of 12–14 carbon atoms; an adduct thereof with up to 5 ethylene oxide groups; or a polyglycol ester of a $C_{10-22}$-aliphatic carboxylic acid; and
(d) a latent curing agent comprising the reaction product obtained by complete neutralization with oxalic acid of (i) a polyamine of the formula $$H_2N-(-CH_2-CH_2-)-NH-_xH$$

wherein $x = 2$, 3, or 4, or of (ii) a reaction product, containing amino groups, of such a polyamine with a fatty acid.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A pipe section having a height of 20 mm and a diameter of 70 mm was placed respectively on two metal sheets having a thickness of 1.5 mm and an area of 150×95 mm, coated with a coating powder based on the epoxy resin "EPIKOTE" 1004 (by Deutsche Shell AG, Hamburg) and 2-phenylimidazoline; in this way, a cylindrical cavity was produced. Cement mortar mixtures having the following composition were poured into these cavities:
100 parts by weight of Portland cement PZ 35 F
328 parts by weight of quartz sand 0–2 mm
72 parts by weight of ground quartz W4
20 parts by weight of emulsion 1 and 2, respectively
50 parts by weight of water The emulsions, in turn, showed the following composition:

| Emulsion 1 | |
|---|---|
| 100 g | of epoxy resin bisphenol A, EP value 0.56 (epoxy number) |
| 23.5 g | of IPD (isophoronediamine) |
| 8.5 g | of oxalic acid |
| 3.8 g | of acetic acid |
| 6.2 g | of phthalic acid |
| 14.5 g | of lauric acid |
| 5.0 g | of lauryl alcohol |
| 87.5 g | of water |
| 247 g | |
| Emulsion 2 | |
| 100 g | of epoxy resin bisphenol A, EP value 0.56 |
| 23.5 g | of IPD |
| 20.0 g | of oxalic acid |
| 6.0 g | of 2-ethylhexanol |
| 60.0 g | of water |

209.5 g

Subsequently, respectively one hook (leg length 80 mm) was placed on the center of the cement mortar surface and pressed into the mortar mixture down to the metal sheet. After a curing period of 24 hours, the pipe sections were removed. Weights were hung onto the hook in each case, and the weight load was increased by respectively 1 Newton (N) until the concrete member was detached from the metal sheet.

Two samples produced analogously were first cured for 7 days via water and subsequently for 7 days via air at 23° C. and thereafter subjected to loads. The adhesive strength values can be seen from Table 1.

COMPARATIVE EXAMPLE A

For comparison purposes, a test specimen was prepared without emulsion, using instead the corresponding amount of water. Otherwise, the procedure was as set forth in Example 1.

TABLE 1

Adhesive Strength Values (Load in N to Detachment) with a Powder Coat Based on Epoxy Resin "EPIKOTE" 1004/2-Phenylimidazoline

| Curing Period at 23° C. in Days | Comparative Example A | Emulsion 1 | Emulsion 2 |
| --- | --- | --- | --- |
| 1 | 29.4 | 98.1 | 98.1 |
| 14 | 22.6 | 105.0 | 144.1 |

EXAMPLE 2

Analogously to Example 1, a metal sheet was coated with coating powder based on epoxy resin "EPIKOTE" 1004/polyester resin "URALAC" P 2228 (by Scado B. V., Zwolle, Netherlands). The adhesive strength value of a cement mortar mixture containing emulsion 2 from Example 1 can be seen from Table 2.

COMPARATIVE EXAMPLE B

For comparison, a test specimen was produced without emulsion, using instead the same quantity of water. Otherwise the process was carried out as described in Example 2.

TABLE 2

Adhesive Strength Values (Load in N to Detachment) with a Powder Coat Based on Epoxy Resin "EPIKOTE" 1004/Polyester Resin "URALAC" 2228

| Example 2 | Comparative Example B |
| --- | --- |
| 63.8 | 19.6 |

EXAMPLES 3–5, COMPARATIVE EXAMPLES C–E

Various coated metal sheets were produced and treated analogously to Example 1 with cement mortar mixtures. While coating powders were used in Examples 3 and 4 and in Comparative Examples C and D, respectively, a cold-curing liquid epoxy resin system was employed in Example 5 and in Comparative Example E, respectively. The coating agent composition and the adhesive strength values can be seen from Table 3.

TABLE 3

Adhesive Strength Values (Load in N to Detachment) for Various Coating Systems after 24 Hours of Curing at 23° C.

| Example | Coating Composition | Cement Mortar Mixture with Water | Emulsion 1 | Emulsion 2 |
| --- | --- | --- | --- | --- |
| 3 | Acrylic resin VP 3949 (a) | | 34.3 | 67.7 |
| C | Acrylic resin VP 3949 (a) | 19.6 | | |
| 4 | Crosslinking agent BF 1540 (b)/Polyester P 3356 (b) | | 34.3 | 98.1 |
| D | Crosslinking agent BF 1540 (b)/Polyester P 3356 (b) | 26.0 | | |
| 5 | "EPIKOTE" 828 (c)/isophoronediamine (b) | | 53.0 | 73.6 |
| E | "EPIKOTE" 828 (c)/isophoronediamine (b) | 34.3 | | |

(a) Manufacturer: Degussa AG, Frankfurt
(b) Manufacturer: Chemische Werke Huls AG, Marl
(c) Manufacturer: Deutsche Shell AG, Hamburg

EXAMPLE 6

A metal sheet coated with coating powder based on epoxy resin "EPIKOTE" 1004/2-phenylimidazoline was spreadcoated with the epoxy resin emulsion 2 from Example 1. After a drying period of 24 hours, the test specimen was coated with the cement mortar mixture from Comparative Example A, and an adhesive strength of 95.0N was determined according to the measuring process described in Example 1.

EXAMPLE 7

For testing adhesive strength between structural steel and cement concrete, a smooth-walled steel member having a diameter of 18 mm and a length of 80 mm, as customarily utilized in concrete construction, was coated with a coating powder based on "EPIKOTE" 1004/2-phenylimidazoline and pressed into the center of a block (basal area 100×100 mm, height 64 mm) made of cement concrete with emulsion 2 (see Example 1) in such a way that the steel member protruded on both sides by 8 mm. After a curing period of 7 days, the steel member was urged out of the block. The force required to do this was 29,100 Newton.

COMPARATIVE EXAMPLE F

The process of Example 7 was repeated, but using a concrete mixture according to Example A. The force for urging the steel member out of the block was in this case 5,900 Newton.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for bonding a painted surface to concrete, comprising treating the painted surface with an epoxy resin-cement mortar mixture comprising an epoxy resin-salt emulsion which comprises:
   (a) a liquid epoxy resin,
   (b) about 30–130 wt. % of water based on the amount of epoxy resin,
   (c) an emulsifying effective amount of an emulsifier comprising a primary, aliphatic alcohol of 8–14 carbon atoms, an adduct thereof with up to 10 ethylene oxide groups, or a mixture thereof, and
   (d) an effective amount of a latent curing agent comprising a reaction product of the essentially complete neutralization of a diamine of the formulae $$H_2N-CH_2-R-NH_2$$

or $$H_2N-R-CH_2-R-NH_2$$

with oxalic acid,
   wherein R is alkyl substituted alkylene or cycloalkylene each of 6–9 carbon atoms in total, or phenyl alkylene of 7–9 carbon atoms in total,
   or
   (a) a liquid epoxy resin,
   (b) water,
   (c) an emulsifier comprising a primary aliphatic alcohol of 12–14 carbon atoms; an adduct thereof with up to 5 ethylene oxide groups; or a polyglycol ester of a $C_{10-22}$-aliphatic carboxylic acid, and
   (d) a latent curing agent comprising the reaction product obtained by complete neutralization with oxalic acid of (i) a polyamine of the formula $$H_2N+CH_2-CH_2-NH+_xH$$

wherein $x = 2$, 3, or 4,
   or of (ii) a reaction product, containing amino groups, of such a polyamine with a fatty acid;
   and drying the applied mixture to form a bond to the painted surface.

2. A method for bonding a painted surface to concrete, comprising treating the painted surface with an epoxy resin emulsion which comprises:
   (a) a liquid epoxy resin,
   (b) about 30–130 wt. % of water based on the amount of epoxy resin,
   (c) an emulsifying effective amount of an emulsifier comprising a primary, aliphatic alcohol of 8–14 carbon atoms, an adduct thereof with up to 10 ethylene oxide groups, or a mixture thereof, and
   (d) an effective amount of a latent curing agent comprising a reaction product of the essentially complete neutralization of a diamine of the formulae $$H_2N-CH_2-R-NH_2$$

or $$H_2N-R-CH_2-R-NH_2$$

with oxalic acid,
   wherein R is alkyl substituted alkylene or cycloalkylene each of 6–9 carbon atoms in total, or phenyl alkylene of 7–9 carbon atoms in total,
   or
   (a) a liquid epoxy resin,
   (b) water,
   (c) an emulsifier comprising a primary aliphatic alcohol of 12–14 carbon atoms; an adduct thereof with up to 5 ethylene oxide groups; or a polyglycol ester of a $C_{10-22}$-aliphatic carboxylic acid, and
   (d) a latent curing agent comprising the reaction product obtained by complete neutralization with oxalic acid of (i) a polyamine of the formula $$H_2N+CH_2-CH_2-NH+_xH$$

wherein $x = 2$, 3, or 4,
   or of (ii) a reaction product, containing amino groups, of such a polyamine with a fatty acid;
   drying the applied emulsion;
   treating the emulsion coated surface with a cement mortar mixture; and
   drying the applied mixture to form a bond to the painted surface.

3. A method of claim 1 wherein the painted surface comprises a surface coated with a cured synthetic resin.

4. A method of claim 2 wherein the painted surface comprises a surface coated with a thermoset.

5. A method of claim 1 wherein the epoxy resin-cement mortar mixture contains 10–30% by weight of the epoxy resin-salt emulsion, based on the amount of cement in the mortar.

6. A method of claim 1 wherein the surface is coated with a power coating composition.

7. A method of claim 2 wherein the surface is coated with a power coating composition.

8. A method of claim 6 wherein the pulverulent coating is based on an epoxy resin/amine combination.

9. A method of claim 1 wherein the surface is that of a metallic or plastic pipe.

10. A method of claim 6 wherein the surface is that of a metallic or plastic pipe.

11. A method of claim 7 wherein the surface is that of a metallic or plastic pipe.

12. A method of claim 1 wherein the surface is coated with a liquid epoxy resin.

13. A method of claim 1 wherein the surface is that of a reinforcing steel rod used to strengthen concrete.

14. An article having a painted surface which is bound to an epoxy resin-cement mortar mixture comprising an epoxy resin-salt emulsion which comprises:
   (a) a liquid epoxy resin,
   (b) about 30–130 wt. % of water based on the amount of epoxy resin,
   (c) an emulsifying effective amount of an emulsifier comprising a primary, aliphatic alcohol of 8–14 carbon atoms, an adduct thereof with up to 10 ethylene oxide groups, or a mixture thereof, and
   (d) an effective amount of a latent curing agent comprising a reaction product of the essentially complete neutralization of a diamine of the formulae $$H_2N-CH_2-R-NH_2$$

or $$H_2N-R-CH_2-R-NH_2$$

with oxalic acid,
   wherein R is alkyl substituted alkylene or cycloalkylene each of 6–9 carbon atoms in total, or phenyl alkylene of 7–9 carbon atoms in total, or (a) a liquid epoxy resin, (b) water, (c) an emulsifier comprising a primary aliphatic alcohol of 12–14 carbon atoms; an adduct thereof with up to 5 ethylene oxide groups; or a polyglycol ester of a $C_{10-22}$-aliphatic carboxylic acid, and (d) a latent curing agent comprising the reaction product obtained by complete neutralization with oxalic acid of (i) a polyamine of the formula $$H_2N\!\!-\!\!(CH_2\!\!-\!\!CH_2\!\!-\!\!NH)_x\!H$$

wherein x = 2, 3, or 4,
or of (ii) a reaction product, containing amino groups, of such a polyamine with a fatty acid.

15. An article having a painted surface, which is bound to an epoxy resin-cement mortar mixture, and which is prepared by the method of claim 1.

* * * * *